(12) United States Patent
Busker

(10) Patent No.: US 12,540,602 B2
(45) Date of Patent: Feb. 3, 2026

(54) METHOD AND WIND FARM CONTROLLER AS WELL AS WIND FARM FOR STORING MEASURED VALUES OF A WIND TURBINE OR A WIND FARM

(71) Applicant: Wobben Properties GmbH, Aurich (DE)

(72) Inventor: Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 406 days.

(21) Appl. No.: 18/177,004

(22) Filed: Mar. 1, 2023

(65) Prior Publication Data

US 2023/0279844 A1 Sep. 7, 2023

(30) Foreign Application Priority Data

Mar. 2, 2022 (EP) .................................... 22159588

(51) Int. Cl.
*F03D 17/00* (2016.01)
*G01D 9/00* (2006.01)
*G01D 9/04* (2006.01)

(52) U.S. Cl.
CPC .............. *F03D 17/00* (2016.05); *G01D 9/00* (2013.01); *G01D 9/04* (2013.01)

(58) Field of Classification Search
CPC .. G01D 9/00; G01D 9/04; F03D 17/00; G06F 17/40; Y02E 10/72

USPC .......................................................... 702/189
See application file for complete search history.

(56) References Cited

U.S. PATENT DOCUMENTS

| 11,668,285 | B2 * | 6/2023 | Kojima | G01N 33/2888 |
| | | | | 702/183 |
| 2012/0130678 | A1 * | 5/2012 | Ishioka | F03D 17/00 |
| | | | | 702/179 |
| 2021/0332797 | A1 * | 10/2021 | Baba | G01R 19/30 |

FOREIGN PATENT DOCUMENTS

| CN | 112698108 A | 4/2021 |
| CN | 109961374 B | 8/2021 |
| JP | 2019052964 A | 4/2019 |

* cited by examiner

*Primary Examiner* — John H Le
(74) *Attorney, Agent, or Firm* — Seed Intellectual Property Law Group LLP

(57) ABSTRACT

A method for storing measured values of a wind turbine or a wind farm comprises recording several chronologically sequential measured values of a measured variable. The method also comprises acquiring a change between a previous measured value of the recorded measured values and the chronologically subsequent measured value of the recorded measured values and comparing the change with an adjustable or predefined threshold value. The method further comprises storing the subsequent measured value in a case where the change lies above the predefined threshold value, or discarding the subsequent measured value in a case where the change lies below the predefined threshold value. Embodiments further relate to a wind farm controller and to a wind farm with a wind farm controller.

17 Claims, 4 Drawing Sheets

METHOD AND WIND FARM CONTROLLER AS WELL AS WIND FARM FOR STORING MEASURED VALUES OF A WIND TURBINE OR A WIND FARM

BACKGROUND

Technical Field

Embodiments of the invention relate to the area of wind turbines, and here in particular to the storing of data of a wind turbine or a wind farm during operation.

Description of the Related Art

Known from prior art are process-controlled storage units, which save data to a storage medium in predefined intervals, so that these data can be evaluated as needed. Such storage units are also called dataloggers. The data to be stored often involve measured values, which also comprise acquired control and regulation parameters of a wind turbine to be controlled or regulated. Such stored data can be used to evaluate the general operation of a wind turbine afterwards, or to be able to understand and assess arising errors or deviations during operation.

In the case of wind turbines, in particular for any meaningful evaluation of wind turbine operation, a very large period of time lying in the past must be considered, for example because specific operating situations only arise at certain times of the year. For example, even errors that arise in a supply network connected with the wind turbine but have just a little if any effect on the components connected with the network are in part only detected late. Therefore, a cause of such errors is often already rooted in events far in the past at the time detected. As a consequence, it is advantageous to have data lying in the distant past available to also understand such errors.

The precondition for a long recording period resulting from the mentioned requirements, for example one lasting for several months, is that a plurality of different measured variables must be stored with a plurality of measured values. This results in a large memory requirement. For example, such a memory requirement comprises several 100 MB per day, making it virtually impossible to realize the memory requirement to enable access to measured values of a plurality of measured variables for several months lying in the past using conventional storage media.

BRIEF SUMMARY

Some embodiments provide a way to record a plurality of measured values of wind turbines or wind farms over a long period of time.

Accordingly, a method for storing measured values of a wind turbine or a wind farm is proposed. Measured values here comprise the measured values of a measured variable, for example a physical variable, but also control parameters and/or regulation parameters. Several sequentially measured values of a measured variable are initially recorded. A measured variable here denotes those physical or adjustable variables to which a measurement applies. Therefore, the term measured variable also comprises adjustable parameters of a control or regulation variable. In general, a measured value can also be designated as a data value as described herein, wherein a measured variable then corresponds to a measurable or adjustable variable, which can have or assume various data values. A measured value is preferably the value of a measured variable delivered or to be delivered by a measuring instrument or a measuring device.

Further acquired is a change between a previous measured value of the recorded measured values and the chronologically subsequent measured value of the recorded measured values. Accordingly, two sequential measured values are considered, wherein the measured value measured first in time is designated as the previous measured value, and the measured value measured later in time is designated as the subsequent measured value. A change between the previous measured value and the subsequent measured value is acquired.

The acquired change is compared with an adjustable or predefined threshold value. Lastly, the subsequent measured value is stored if the change lies above the threshold value. In a case where the change lies below the threshold value, the subsequent measured value is discarded, meaning not stored.

As a consequence, a threshold value can be set or predefined, and measured values of the measured variables are only stored if they exhibit a change relative to the previous measured value that lies above the threshold value. Therefore, the subsequent measured value is only stored in a case where the change that leads to this subsequent value lies above the threshold value.

Those slight changes in the measured values of a measured variable that lie below the threshold value are thus discarded, so that only significantly changing measured values as manifested by a change above the threshold value are stored.

Some embodiments are based upon the knowledge that a plurality of the considered measured variables essentially always remains constant, or at least remains essentially constant over a long period of time, during the operation of a wind turbine or a wind farm. At the very least, this applies when no anomalies or peculiarities arise during operation that indicate a deviation from normal operation. Therefore, storing a measured value of a measured variable that is always the same or always essentially the same uses up significant memory without offering any added value for a subsequent evaluation. This makes it possible to discard measured values which thus do not differ from a previous measured value, without suffering any significant loss of information about the data of the measured variable for a subsequent evaluation.

According to a first embodiment, the recording of several chronologically sequential measured values of a measured variable comprises the recording of sequential measured values with an adjustable time interval between the individual recordings of the individual measured values. Therefore, the measured values are recorded with a sampling rate corresponding to the time interval, and are thus equidistant to each other in terms of time.

By establishing a time interval, it can be defined for the measuring variable whether rapid changes in the measured variable are detected or hidden. In addition, the number of changes in a measured variable can in this way be varied and in particular optimized, so as to further reduce memory. For example, it is possible to record a measured variable that corresponds to a nacelle position of a wind turbine and whose measured values thus comprise values in degrees by selecting a comparatively slight predefined threshold value. In addition, the time interval selected between the measured values can be comparatively large. By contrast, a comparatively high threshold value and comparatively slight time interval can be selected for recording a network frequency or voltage of a network with which the wind turbine or the wind farm is connected for feeding in energy. As a consequence, adjusting the threshold value and the time interval to the measured variable leads to a further reduction in required memory.

According to another embodiment, measured values of several different measured variables are stored by recording chronologically sequential measured values for each of the several different measured variables, acquiring the changes in chronologically sequential measured values, and comparing the changes with the threshold value. According to this embodiment, however, a respective individual threshold value is predefined or set for each of the measured variables, and allocated to the respective measured variable. The change for the measured values of the respective measured variable is compared using the allocated threshold value.

Therefore, several measured variables are considered, and the changes in the measured values for the measured variables are compared with the threshold values allocated to the respective measured variable for each of the measured variables. Accordingly, subsequent measured values of a measured variable are stored in a case where an acquired change lies above the threshold value of this measured variable. Otherwise, the subsequent measured values of the measured variable are discarded, specifically if their acquired change lies below the threshold value of this measured variable.

In this way, different threshold values can be set or predefined for different measured variables, so that memory can be further reduced by adjusting the threshold value for the respective measured variable.

According to another embodiment, several measured variables are allocated to a group. In a case where at least one change in a measured variable of the group that lies above the threshold value allocated to the measured variable is acquired while comparing the changes in measured values, the subsequent measured value for this measured variable along with the previous and/or subsequent measured value of each additional measured variable also allocated to the group is thereupon stored. It is especially preferred that the subsequent measured value be stored for the measured variable that has a change lying above the threshold value allocated to the measured variable, and that the last recorded measured value be stored for all additional measured variables.

By providing the group, several measured variables that are technically related can be summarized in this way. In a case where one of the measured variables of the group has a notable or unusual change that could possibly lead to a desired evaluation at a later point, all measured variables technically related thereto are also recorded. This enables an overall evaluation of all technically related measured variables, since all measured values are stored for the time in question.

According to another embodiment, measured values of several different measured variables are stored by recording the respective chronologically sequential measured values of each measured variable, acquiring the time changes of the sequential measured values, and comparing these changes with a set or predefined threshold value or with the respective individual threshold values predefined or set for the measured variable. In addition, a respective individual time interval is also allocated to each measured variable, and the several chronologically sequential measured values of the respective measured variable are recorded with the allocated time interval.

Therefore, different scanning rates are set or predefined for the measured values of the different measured variables. As a consequence, the required memory for measured values that change comparatively infrequently or slowly over time can be further reduced, while measured values that change comparatively quickly or frequently can continue to be recorded at a higher scanning rate, meaning at a smaller time interval, in such a way that all significant changes can be acquired.

According to another embodiment, the measured values of each measured variable are stored at predefined times or after a duration predefined or set for the respective measured variable has elapsed, regardless of a comparison of the change in sequential values and the comparison of the change with the predefined threshold value. As a result, a measured value that changes very slowly to a slight extent, so that a change always remains below the threshold value predefined for the measured variable, is not recorded or stored for a long time, specifically until a change that exceeds the threshold value is detected.

According to another embodiment, the threshold value for comparing the measured values of a measured variable is automatically increased if more than a predefined maximum number of measured values is stored within a predefined time period. The selected predefined time period is here preferably longer than a time period that would be relevant for the measured variable to consider a special or faulty situation. For example, the predefined time period is thus to be defined as a longer time period lasting several minutes or even hours. In a case where the selected threshold value is too low, so that too large a number of measured values of a measured variable are stored, this makes it possible to ensure that the threshold value is automatically increased, thereby reducing the number of measured values to be stored after the change. Automatically adjusting the threshold value results in a further reduction in required memory.

According to another embodiment, the threshold value for comparing the measured values of a measured variable is automatically lowered if predefined conditions are present within a predefined observation period, which preferably is significantly smaller than the aforementioned predefined time period. For example, these predefined conditions comprise an acquired change in the sequential measured values that lies above a second threshold value, or several directly sequential acquired changes in a measured variable that lie above the threshold value. As a result, it can be ensured that a possibly interesting fluctuation in the measured values of a measured variable acquired by the predefined conditions will be stored with a higher accuracy. It is especially preferred that the threshold value be lowered for a predefined duration, wherein the lowered threshold value is reset again once the predefined duration has elapsed.

As a consequence, ranges of interest can be resolved higher, and the measured values of this range of interest can be automatically acquired with an improved resolution. In addition, once the predefined duration has elapsed, it can be assumed that the measured variable is again moving within normal parameters, so that the threshold value can also be reset again accordingly.

According to another embodiment, each stored measured value comprises a timestamp. Therefore, the measured value is stored together with a timestamp, making it possible to understand at what point in time the measured value was stored.

According to another embodiment, measured values are stored irregularly and no longer with a fixed scanning rate. However, the timestamp makes it possible to enable a comparability of the measured values of different measured variables, because measured values of different measured variables but with the same or closely adjacent timestamps can be evaluated.

According to another embodiment, the timestamp comprises a time or day counter. However, the timestamp is dateless. Therefore, the required memory is reduced by allocating to the timestamp only a time or counter from which a time can be derived.

According to an embodiment, measured values that were recorded on different days are stored within different files. The files are provided with an indicator that specifies the day on which the measured values contained in the file were recorded. Therefore, the file indicator, for example the file name, can be used to infer the day on which the measured values in the file were recorded.

According to another embodiment, a first group comprises several or all of the measured variables mains voltage, mains effective power, mains reactive power and mains frequency. The files in which the measured values are stored are especially preferably each smaller than 5 MB, preferably smaller than 2 MB, or especially preferably smaller than 1 MB. The measured values are further preferably stored in Excel files or as a Comma-Separated Values ("CSV") file.

In addition, some embodiments relate to a wind farm controller, which is set up to implement the steps of the method.

According to an embodiment, the wind farm controller comprises a port for a data line for connection with several wind turbines and for receiving measured values from the several wind turbines in order to store the measured values according to the method.

In addition, some embodiments relate to a wind farm with a wind farm controller according to the aforementioned embodiment.

BRIEF DESCRIPTION OF THE SEVERAL VIEWS OF THE DRAWINGS

Additional embodiments may be gleaned from the embodiments described in more detail on the figures.

DETAILED DESCRIPTION

Figure 1:
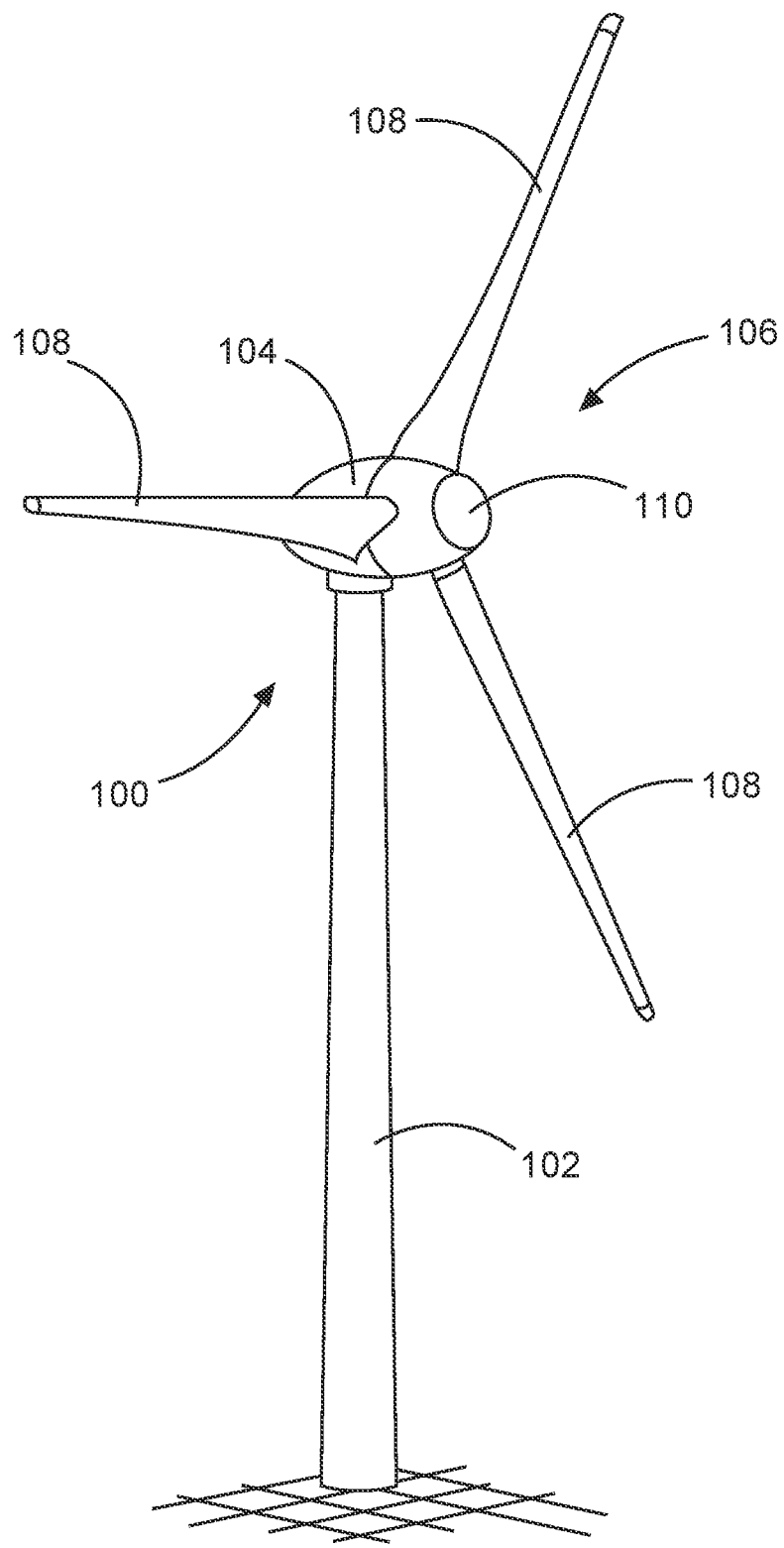
FIG. 1 shows a wind turbine.

FIG. 1 shows a schematic view of a wind turbine 100. The wind turbine 100 has a tower 102 and a nacelle 104 on the tower 102. Provided on the nacelle 104 is an aerodynamic rotor 106 with three rotor blades 108 and a spinner 110. During operation of the wind turbine 100, the aerodynamic rotor 106 is made to rotate by the wind, and thus also turns an electrodynamic rotor or runner of a wind turbine generator, which is directly or indirectly coupled with the aerodynamic rotor 106. The electric wind turbine generator is arranged in the nacelle 104, and generates electric energy. The pitch angles of the rotor blades 108 can be changed by pitch motors on the rotor blade roots of the respective rotor blades 108.

Figure 2:
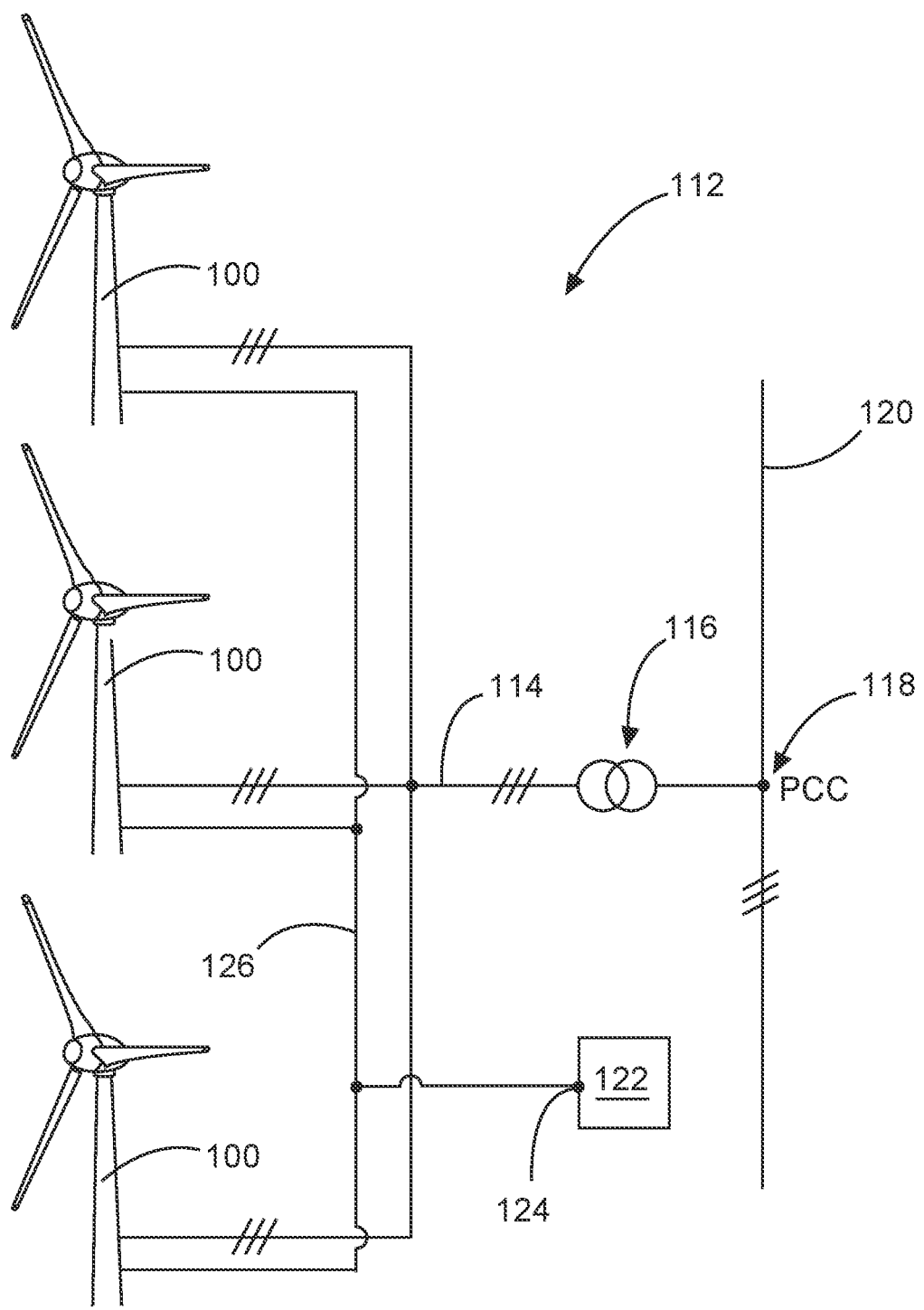
FIG. 2 shows a wind farm.

FIG. 2 shows a wind farm 112 with three wind turbines 100, as an example, which can be identical or different. As a consequence, the three wind turbines 100 are representative for basically any number of wind turbines 100 of a wind farm 112. The wind turbines 100 provide their power, specifically in particular the generated current, via an electrical farm network 114. The respectively generated currents or power of the individual wind turbines 100 are here added together, and a transformer 116 is most often provided, which transforms up the voltage in the farm, to then feed it into the supply network 120 at the infeed point 118, which is also generally referred to as PCC. In addition, the wind farm 112 comprises a wind farm controller 122, which has a data interface 124. The data interface 124 is connected with the wind turbines 100 by a data line 126, so as to receive measured values from the wind turbines 100 and send control or regulation data to the wind turbines 100.

Figure 3:
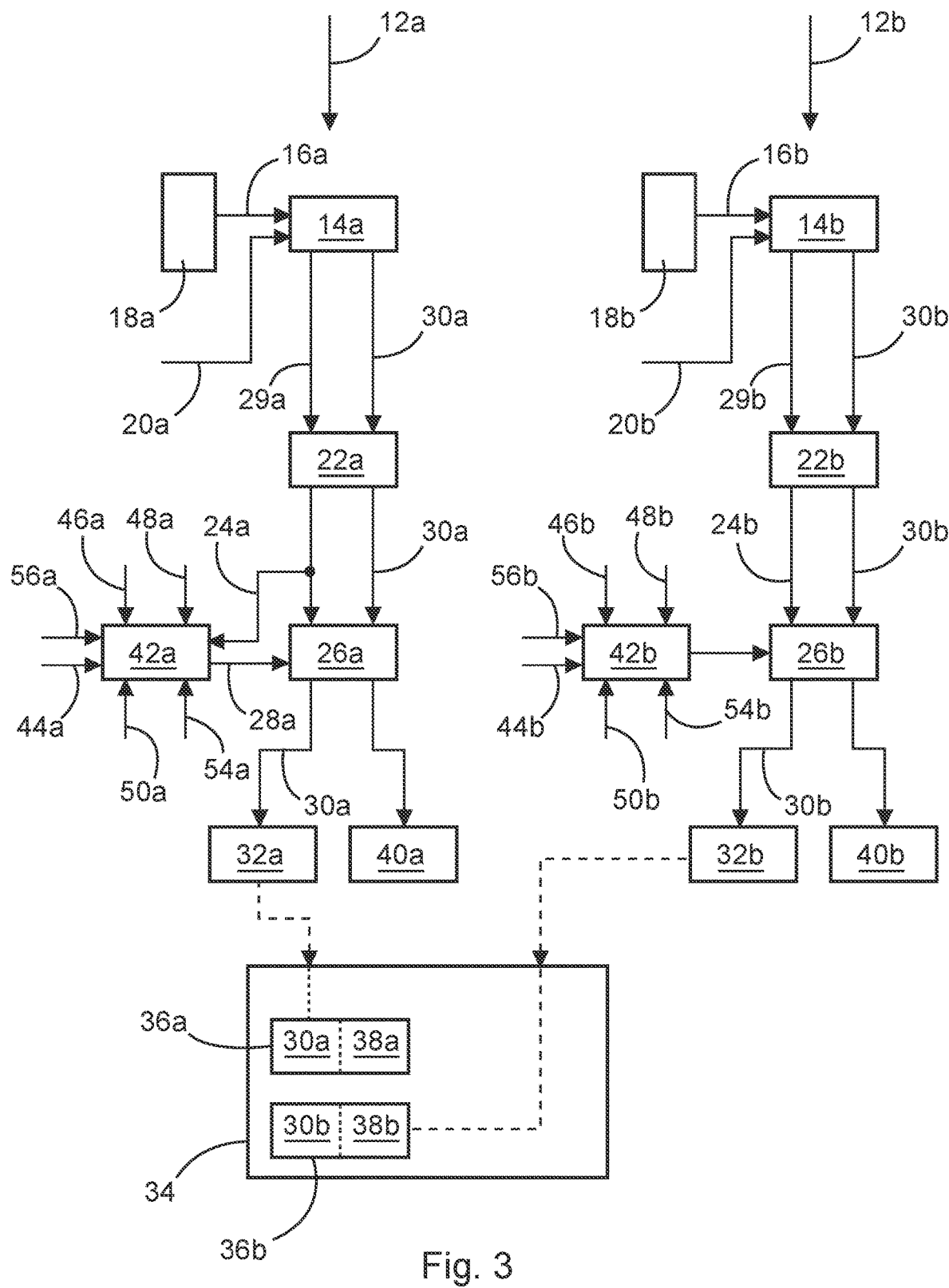
FIG. 3 shows the steps in a method according to an embodiment.

FIG. 3 shows a method 10 according to an embodiment. The method 10 for recording measured values of several measured variables is depicted on FIG. 3. Accordingly, the steps for recording the first measured variable 12*a* are shown on the left side of FIG. 3, and the steps for recording the second measured variable 12*b* are shown on the right side of FIG. 3. The steps run in parallel.

The method 10 will initially be described with respect to the first measured variable 12*a*. Measured values 16*a* are recorded by a sensor 18*a* in a step 14*a*. For this purpose, a time interval 20*a* is introduced, and used for recording the measured values 16*a*. In the ensuing step 22*a*, a change is acquired between a previous measured value 29*a* of the recorded chronologically sequential measured values 16*a* and a chronologically subsequent measured value 30*a* of the recorded chronologically sequential measured values 16*a*. The change 24*a* is transferred to a step 26*a*, to which a threshold value 28*a* is supplied, in order to compare the change 24*a* with the threshold value 28*a* in step 26*a*.

If the comparison finds that the change 24*a* lies above the predefined threshold value 28*a*, the subsequent measured value 30*a* is transferred to a step 32*a*, in which the subsequent measured value 30*a* is stored in a file 34. The subsequent measured value 30*a* is stored in an entry 36*a* together with a timestamp 38*a*. If the comparison in step 26*a* finds that the change 24*a* lies below the predefined threshold value 28*a*, the subsequent measured value 30*a* is discarded in step 40*a*.

Further provided is a step 42*a*, which can be used to adjust the threshold value 28*a* considered during the comparison 26*a*. A check is performed in step 42*a* to determine whether predefined conditions 46*a* are present within a predefined observation period 44*a*. For example, these predefined conditions 46*a* comprise a change 24*a* in the sequential measured values 16*a* above a second predefined threshold value 48*a* or several sequential changes 24*a* above the threshold value 28*a*, meaning several subsequent measured values 30, which are stored within the observation period. If this is the case, meaning if the conditions 46*a* are present within the observation period 44*a*, the threshold value 28*a* is lowered to achieve a more precise resolution by storing comparatively more often. After a predefined duration 50*a* has elapsed, the threshold value 28*a* is then reset again. Alternatively, it is also possible to increase the threshold value 28*a* in step 42*a*. For example, this is done by recording a predefined maximum number 54*a* of measured values 16*a* within a predefined time period 56*a*. This must here be taken as an indication that the threshold value 28*a* is set comparatively too low, and that too many values are being stored, resulting in too much memory being consumed.

The steps of the method are cyclically repeated for each recorded measured value 16*a*. This means that a first cycle begins after two sequential measured values 16*a* were recorded, of which one of the measured values 16*a* is a previous measured value 29*a*, and the measured value 16*a* recorded later is the subsequent measured value 30a. The method 10, specifically at least the acquisition of the change 24a and comparison with the threshold value 28a, is implemented for these two measured values 16a. If a new measured value 16a is recorded, a new cycle of the shown steps begins, since the subsequent measured value 30a then becomes the previous measured value 29a, and the newly recorded measured value 16a now corresponds to the subsequent measured value 30a. The change 24a is now acquired for these two measured values 16a, and this change 24a is compared with the predefined threshold value 28a. The identical steps for the second measured variable 12b are shown in parallel on the right side. Accordingly, identical reference numbers with the following letter "b" correspond to the steps for a second measured variable 12b, which were already described above for the first measured variable 12a and designated with an "a" for the first measured variable.

Figure 4:
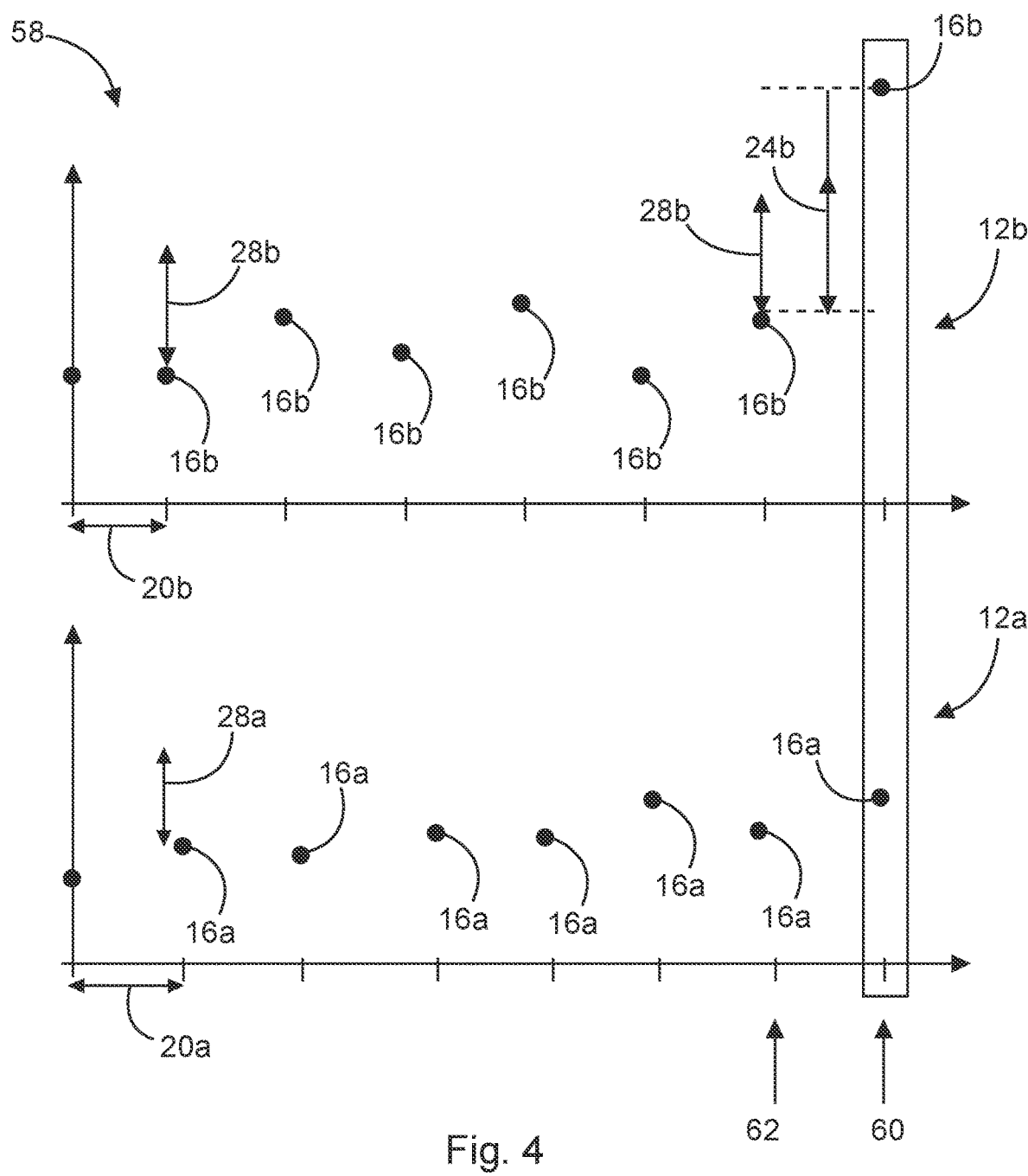
FIG. 4 shows a group of two measured variables.

FIG. 4 shows the grouping of two measured variables, for example the measured variables 12a, 12b from FIG. 3. The measured variables 12a, 12b are recorded with the time interval 20a of the first measured variable 12a, which here corresponds to the time interval 20b of the second measured variable 12b for a better overview. However, different threshold values 28a, 28b are established for both measured variables 12a, 12b. The measured values 16a of the first measured variable 12a are essentially constant, so that a change 24a always lies below the threshold value 28a. Therefore, the recorded measured values 16a would not be stored, but instead always discarded. However, it is determined at time 60 that the measured value 16b has changed in relation to its previous measured value 29b at time 62 by more than the threshold value 28b, specifically by change 24b. Accordingly, the measured value 16b is stored at time 62, which corresponds to the subsequent measured value 30b, and at the same time, since the simultaneously arising measured value 16a belongs to a measured variable 12a that is combined into a group 58 with the measured variable 12b, is likewise stored. Therefore, the measured values 16a, 16b are stored at time 60.

REFERENCE LIST

10 Method
12a, 12b Measured variable
14a, 14b Recorded measured values
16a, 16b Measured values
18a, 18b Sensor
20a, 20b Predefined time interval
22a, 22b Acquire change
24a, 24b Change
26a, 26b Compare change with threshold value
28a, 28b Threshold value
29a, 29b Previous measured value
30a, 30b Subsequent measured value
32a, 32b Store subsequent measured value
34 File
36a, 36b Entry
38a, 38b Timestamp
40a, 40b Discard subsequent measured value
42a, 42b Adjust threshold value
44a, 44b Predefined observation period
46a, 46b Predefined conditions
48a, 48b Second predefined threshold value
50a, 50b Predefined duration
54a, 54b Predefined maximum number
56a, 56b Predefined time period
58 Group
60 Time
62 Time
100 Wind turbine
102 Tower
104 Nacelle
106 Aerodynamic rotor
108 Rotor blades
110 Spinner
112 Wind farm
114 Electrical farm network
116 Transformer
118 Infeed point
120 Supply network
122 Wind farm controller
124 Data interface
126 Data line The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for storing measured values of a wind turbine or a wind farm, comprising:
   a) recording a plurality of chronologically sequential measured values of a measured variable,
   b) acquiring a change between a previous measured value of the measured values and a chronologically subsequent measured value of the measured values,
   c) comparing the change with a threshold value, and either:
   d) storing the chronologically subsequent measured value in a computer-readable medium in a case where the change is greater than the predefined threshold value, or
   e) discarding the chronologically subsequent measured value in a case where the change is less than the threshold value,
   wherein several measured variables are allocated to a group, wherein, in the case where a change in at least one of the measured variables of the group is acquired during the comparing in step c) that is greater than the threshold value allocated to the measured variable, step d) is performed for the at least one of the measured variables, and the previous measured value and/or subsequent measured value is stored, and
   wherein, in the case where a change in at least one of the measured variables of the group is acquired during the comparing in step c) that is greater than the threshold value allocated to the measured variable, step d) is performed for the at least one of the measured variables, and a last measured value of each additional measured variable of the group is stored.

2. The method according to claim 1, wherein recording the plurality of chronologically sequential measured values comprises recording the plurality of chronologically sequential measured values with an adjustable time interval.

3. The method according to claim 1, wherein measured values of a plurality of different measured variables are stored by performing steps a) to c) or a) to d) for each of the plurality of different measured variables, wherein each measured variable of the plurality of different measured variables has a respective individual threshold value, and the change for the measured values of each measured variable of the plurality of different measured variables is compared using the threshold value allocated to the measured variable.

4. The method according to claim 1, wherein measured values of several different measured variables are stored by performing steps a) to c) or a) to d) for each of the several different measured variables, wherein a respective individual time interval is allocated to each measured variable of the several different measured variables, and chronologically sequential measured values of each measured variable of the several different measured variables are recorded using the respective individual time interval allocated to the measured variable.

5. The method according to claim 1, wherein independently of step c), measured values of each measured variable are stored at predefined times or after a duration predefined or set for each measured variable has elapsed.

6. The method according to claim 1, wherein the threshold value for comparing the measured values of a measured variable is automatically increased if more than a predefined maximum number of measured values are stored within a predefined time period.

7. The method according to claim 1, wherein the threshold value for comparing the measured values of a measured variable is automatically lowered if predefined conditions are present within a predefined observation period, comprising:
  an acquired change above a second threshold value,
  several sequential changes above the threshold value.

8. The method according to claim 7, wherein lowering of the threshold value only takes place for a predefined duration, and a lowered threshold value is reset once the predefined duration has elapsed.

9. The method according to claim 1, wherein a timestamp is stored for each stored measured value.

10. The method according to claim 9, wherein the timestamp comprises a time or day counter, and is dateless.

11. The method according to claim 1, wherein measured values that were recorded on different days are stored within different files, wherein the different files are provided with an indicator that specifies a day on which the measured values contained in each of the different files were recorded.

12. The method according to claim 1, wherein a group of measured variables is predefined that comprises several or all of a mains voltage, a mains effective power, a mains reactive power and a mains frequency, and/or wherein each of a plurality of files for storing the measured values is smaller than 5 MB, and/or the files are Excel files or CSV files.

13. The method according to claim 1, wherein a group of measured variables is predefined that comprises several or all of a mains voltage, a mains effective power, a mains reactive power and a mains frequency, and/or wherein each of a plurality of files for storing the measured values is smaller than 2 MB, and/or the files are Excel files or CSV files.

14. The method according to claim 1, wherein a group of measured variables is predefined that comprises several or all of a mains voltage, a mains effective power, a mains reactive power and a mains frequency, and/or wherein each of a plurality of files for storing the measured values is smaller than 1 MB, and/or the files are Excel files or CSV files.

15. A wind farm controller, which is set up to implement a method for storing measured values of a wind turbine or a wind farm, the method comprising:
  a) recording several chronologically sequential measured values of a measured variable,
  b) acquiring a change between a previous measured value of the measured values and a chronologically subsequent measured value of the measured values,
  c) comparing the change with a threshold value, and either:
    d) storing the chronologically subsequent measured value in a computer-readable medium in a case where the change is greater than the threshold value, or
    e) discarding the chronologically subsequent measured value in a case where the change is less than the threshold value,
  wherein several measured variables are allocated to a group, wherein, in the case where a change in at least one of the measured variables of the group is acquired during the comparing in step c) that is greater than the threshold value allocated to the measured variable, step d) is performed for the at least one of the measured variables, and the previous measured value and/or subsequent measured value is stored, and
  wherein, in the case where a change in at least one of the measured variables of the group is acquired during the comparing in step c) that is greater than the threshold value allocated to the measured variable, step d) is performed for the at least one of the measured variables, and a last measured value of each additional measured variable of the group is stored.

16. The wind farm controller according to claim 15, wherein the wind farm controller has a data interface for a data line in order to receive measured values from several wind turbines.

17. A wind farm with a wind farm controller according to claim 15.

* * * * *